United States Patent
Basham

(10) Patent No.: US 9,845,862 B2
(45) Date of Patent: Dec. 19, 2017

(54) AXLE VENT

(75) Inventor: Daniel Basham, Pylesville, MD (US)

(73) Assignee: W. L. Gore & Associates, Inc., Newark, DE (US)

( * ) Notice: Subject to any disclaimer, the term of this patent is extended or adjusted under 35 U.S.C. 154(b) by 1731 days.

(21) Appl. No.: 11/406,582

(22) Filed: Apr. 17, 2006

(65) Prior Publication Data

US 2007/0240537 A1  Oct. 18, 2007

(51) Int. Cl.
| | |
|---|---|
| *F16H 57/027* | (2012.01) |
| *F16K 24/04* | (2006.01) |
| *F01M 1/10* | (2006.01) |
| *B01D 46/00* | (2006.01) |
| *B01D 53/14* | (2006.01) |

(52) U.S. Cl.
CPC ....... *F16H 57/027* (2013.01); *B01D 46/0024* (2013.01); *B01D 46/0036* (2013.01); *B01D 53/14* (2013.01); *F01M 1/10* (2013.01); *F16K 24/04* (2013.01); *Y10T 74/2188* (2015.01)

(58) Field of Classification Search
CPC .... F16H 57/027; F16K 24/04; Y10T 74/2188; F01M 1/10; F01M 13/0033; F01M 13/04; F01M 13/0405; B01D 46/0024; B01D 46/0036; B01D 46/14; B01D 53/14
USPC ....... 74/607, 606 R, 606 A; 184/6.23, 105.3; 55/385.3, 385.4; 96/134
See application file for complete search history.

(56) References Cited

U.S. PATENT DOCUMENTS

| | | | |
|---|---|---|---|
| 1,522,068 A * | 1/1925 | Morgan | 74/421 R |
| 2,795,290 A * | 6/1957 | Butsch et al. | 96/17 |
| 3,221,575 A * | 12/1965 | Butler | 475/31 |
| 3,251,475 A * | 5/1966 | Till et al. | 210/508 |
| 3,812,928 A * | 5/1974 | Rockwell et al. | 180/65.51 |
| 4,136,796 A * | 1/1979 | Dubois et al. | 220/259.4 |
| 4,351,203 A * | 9/1982 | Fukunaga | 74/606 R |
| 4,440,308 A | 4/1984 | Baker | 220/204 |
| 4,753,730 A * | 6/1988 | Maurer | 210/483 |
| 5,348,570 A * | 9/1994 | Ruppert et al. | 96/6 |
| 5,492,393 A * | 2/1996 | Peisker et al. | 301/108.1 |
| 5,522,769 A * | 6/1996 | DeGuiseppi | 454/270 |
| 5,571,604 A * | 11/1996 | Sprang et al. | 428/212 |
| 5,860,708 A | 1/1999 | Borders et al. | 301/108 |
| 5,891,223 A | 4/1999 | Shaw et al. | |
| 5,914,415 A | 6/1999 | Tago | |
| 6,296,691 B1 * | 10/2001 | Gidumal | B01D 46/0032 360/99.16 |
| 6,447,565 B1 * | 9/2002 | Raszkowski et al. | 55/385.4 |

(Continued)

FOREIGN PATENT DOCUMENTS

| | | |
|---|---|---|
| DE | 10 2004 046 844 A1 | 6/2005 |
| EP | 0 744 153 A1 | 5/1996 |

OTHER PUBLICATIONS

Microscopy Research and Technique 25:447-455 (1993) Oil Sorption Behavior of Various Sorbents Studied by Sorption Capacity Measurement and Environmental Scanning Electron Microscopy Byung-Min Choi and Jerry P. Moreau.

*Primary Examiner* — Terry Chau
(74) *Attorney, Agent, or Firm* — Amy L. Miller

(57) ABSTRACT

A vent for a machinery enclosure such as an automotive axle comprises a vent body having passageway between the interior of the enclosure and the exterior of the enclosure and an ePTFE membrane covering the passageway. The membrane and a fibrous sorbent are disposed within the passageway between the interior of the enclosure and the membrane.

50 Claims, 6 Drawing Sheets

(56) References Cited

U.S. PATENT DOCUMENTS

| | | |
|---|---|---|
| 6,521,012 B2 * | 2/2003 | Lamon et al. .................. 55/524 |
| 6,712,887 B2 | 3/2004 | Ueki et al. |
| 7,156,890 B1 * | 1/2007 | Thompson et al. ......... 55/385.3 |
| 7,259,606 B2 | 8/2007 | Ku et al. |
| 2002/0112802 A1 * | 8/2002 | D'Amico et al. ............ 152/415 |
| 2003/0101866 A1 * | 6/2003 | Noack .............................. 95/45 |

* cited by examiner

Aerosol Generator  Test Sample  Flow meter

FIG. 6

AXLE VENT

BACKGROUND OF THE INVENTION

The invention relates to the field of machinery venting. More specifically, the invention provides a novel vent for an enclosure containing lubricated machinery.

Gas-permeable, liquid-impermeable vents find use in many applications in the automotive industry, such as electrical component housings, gear housings, vehicle bodies, brake housings, etc. where pressure equalization between the housing interior and surrounding environment must occur. While vents must allow for gas pressure equalization, they must also seal the interior of the housing from liquid, dirt and dust particles. Failure to exclude liquids such as water can damage the components and corrode the housing.

Machinery enclosures such as gearbox housings, axles and the like are subject to thermal cycling. As the machinery is operated, temperatures of the lubricant and internal air begin to rise, causing air pressure to rise in the enclosure. When the machinery is stopped, pressure falls within the enclosure. To accommodate changes in air pressure from operating temperature changes, vents are required. If effective venting is not provided, seals and gaskets may be compromised. It is important that contaminants be prevented from entering the machinery enclosure. Contaminants and water will severely degrade the effectiveness of lubricant, which results in premature wear of the machinery.

Machinery vents have incorporated expanded Polytetrafluoroethylene (ePTFE) membranes. Such membranes are known for water impermeability and air permeability and therefore not only prevent contaminants from entering the gear case, but also contain the lubricant to prevent spillage. However, ePTFE vents are subject to rapid blinding as lubricant aerosol particles fill the membrane pores and block airflow. Accordingly, known ePTFE vents had limited service life.

Other attempts at venting machinery spaces have incorporated baffles, coalescing media or valve assemblies which permit expanding air to escape through valve openings. During cooling periods, such assemblies permit air ingress through a second valve assembly, or through a membrane. Such assemblies necessarily incorporate numerous moving parts which are subject to wear and have increased assembly complexity.

Some machinery vents are mounted remotely from the machinery. Remote mounting allows the vent to be placed in an area with limited environmental exposure, and could reduce the problems associated with lubricant blinding. Other gear cases incorporate a simple snorkel to vent the case to a remote and relatively protected area. Such snorkels provide little protection from contamination and will not prevent lubricant spillage. Moreover, all remote mounting approaches introduce additional parts cost and installation complexity.

What is needed is a vent without moving parts that can be mounted in close proximity or directly to a machinery enclosure that allows adequate air passage, prevents contaminants and liquid from entering the machinery space, and retains liquids inside the enclosure in the event it is oriented to allow liquids to contact the vent.

SUMMARY OF THE INVENTION

In one aspect, the invention provides a vented automotive gearcase comprising a gear assembly disposed within a fluid-tight enclosure, lubricant disposed within the enclosure, a passageway providing fluid communication between the interior of the enclosure and the exterior, gas permeable, water impermeable membrane covering the passageway, and fibrous sorbent disposed within the passageway between the lubricant and the ePTFE membrane.

In another aspect, the invention provides a vented machinery enclosure, comprising a fluid tight housing defining an interior space and an exterior space, the space containing lubricant, a vent comprising a body having a passageway there through, a gas permeable, water impermeable membrane covering the passageway, and a fibrous sorbent disposed within the passageway and adjacent to the first side of said membrane, the fibers of the sorbent having voids.

In a further aspect, the invention provides a vent for a machinery space, the vent comprising a body having a passageway there through, gas permeable, water impermeable membrane covering the passageway, and fibrous sorbent disposed within the passageway between the machinery space and the membrane.

In a still further aspect, the invention provides an improved vent for a machinery enclosure of the type containing a passageway for the passage of a gas between the interior of the enclosure and the ambient air and a porous membrane sealing the passageway, the improvement comprising fibrous sorbent disposed within the passageway between the membrane and the interior of the enclosure.

In yet another aspect, the invention includes a method of venting a machinery space of the type providing a passageway for venting a gas from the interior of the machinery space and a porous membrane covering the passageway, the improvement comprising a fibrous sorbent between the membrane and the interior of the machinery space.

DESCRIPTION OF THE DRAWINGS

Figure 6:
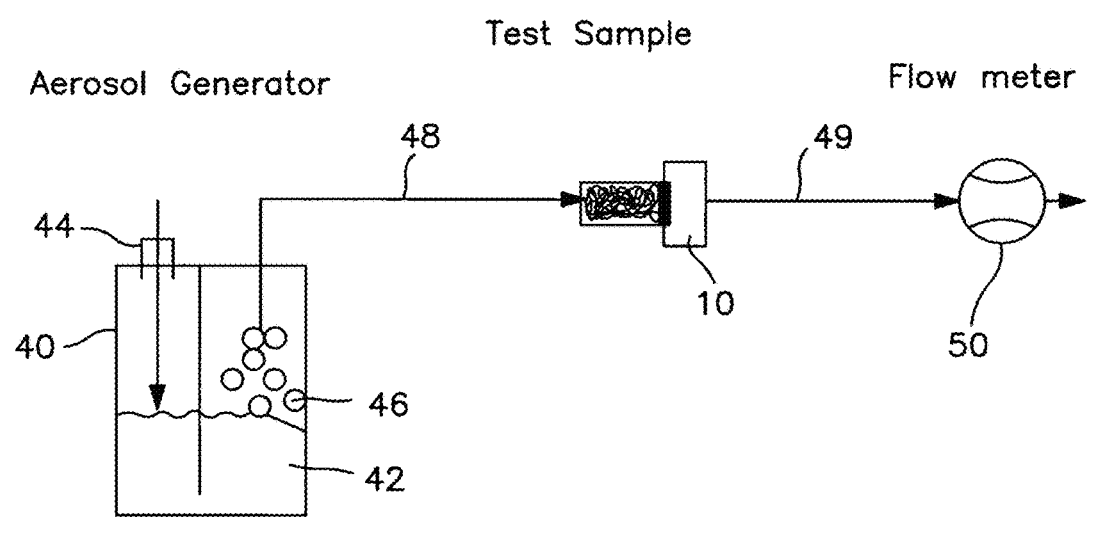

FIG. 6 depicts a schematic diagram of the apparatus use to test venting performance.

DETAILED DESCRIPTION OF THE INVENTION

Figure 1:
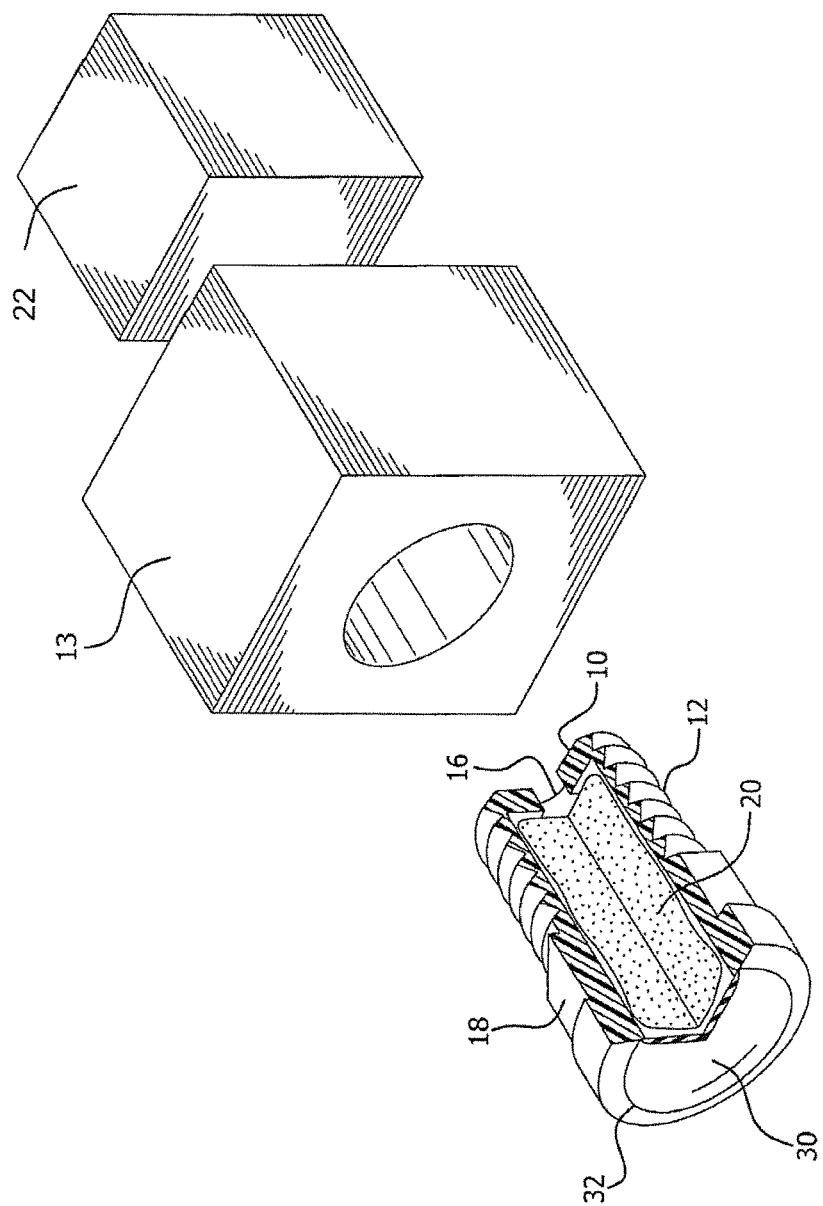
FIG. 1 depicts a perspective view of one aspect of the inventive vent

Definition of terms.

By "Absorption" is meant a process by which liquid or gas molecules are taken up, or enter a bulk phase, this differs from adsorption because the particles are taken up by a volume rather than by a surface. An absorbent retains liquid or gas molecules by absorption.

By "Adsorption" is meant a process by which a liquid or gas molecules accumulate on the surface of a solid. An "adsorbent" retains liquid or gas molecules by adsorption.

By "Aerosol" is meant a gaseous suspension of fine (0.10-100 μm) solid or liquid particles. An aerosol includes a mist, cloud, fog and the like.

By "Oleophilic" is meant a material that has a surface with an affinity for oil.

By "Gear Case" is meant as an axle, transmission, transfer case and other assembly having lubricated moving parts generating shear forces on the lubricant.

By "Hydrophobic" is meant materials that have a surface that is extremely difficult to wet with water, with water contact angles in excess of 90°.

By "Sorbent" is meant a solid material having the ability to retain gasses or liquids; as used herein, Sorbent includes materials that are absorbent, adsorbent or both.

The vent body of the present invention may be machined or cast from metallic or polymeric materials. When used as an axle or automotive machinery vent, the vent may be installed in a cast iron housing. Accordingly, if metal vents are preferred, they may be machined from stainless steel to avoid corrosion and bi metallic corrosion. Alternatively, metal vents may be plated with zinc for example to inhibit corrosion. Preferably, the bodies of the inventive vents are constructed from polymeric materials. Polymeric vent bodies facilitate easy processing, including heat sealing of the membrane to the body. Polymeric materials are low cost and are not subject to corrosion. Most preferably, the polymeric material is a polyamide. Polyamide 6.6 is ultimately preferred because of its favorable cost and strength.

The vent body may be constructed in various shapes conducive to easy installation in machinery housings. Those of skill in the art will comprehend press in type vents, which seal by interference fit, threaded vents, barbs, adhesives and other attachment means may be utilized with due regard to the intended application. The form of the vent body is not critical, provided that a through passageway extends through the body to allow the passage of air.

In some applications, an elastomer is the preferred body material. The compliance and resilience of such materials allow them to compensate for tolerances in mating components such as these in the machinery enclosure. In addition, in applications where impact from foreign objects is possible, such materials can be less prone to damage or failure.

The passageway may be machined or cast within the vent body. While many methods of providing the passageway are apparent, the vent body is preferably cast or molded with a passageway there through to avoid the additional processing of boring the body. The passageway defines a volume sufficient to contain sorbent media. This volume may be defined by a straight or tapered bore. Preferably, a counter bore may be provided proximate to the head of the vent. The counter bore is sufficiently voluminous to contain sorbent material, while the narrower bore proximate to the machinery enclosure serves to contain the sorbent material and provide the passageway from the machinery enclosure to the sorbent.

With reference to FIG. 1, a vent body (10) is provided having a passageway (16) there through. The body incorporates a threaded portion (12) for insertion in a tapped hole in a machinery enclosure. The body further includes a hexagonal portion (18) for driving the vent into the tapped hole. Fibrous sorbent (20) is disposed within the passageway. The open end of the passageway is covered by a membrane (30) to prevent water from entering the enclosure. The membrane is attached to the vent body by a heat seal (32).

It is desirable to prevent liquid lubricants within the machinery enclosure (13) enclosing gear assembly (22) from contacting the sorbent media. Accordingly, check, ball or other one-way flow control devices (not shown) may be incorporated into the passageway (16) of the vent body. Alternatively, the passageway may incorporate a tortuous path therein to contain the lubricant and prevent it from contacting the sorbent and or membrane.

The fibrous sorbent (20) effectively prevents membrane (30) from blinding by reducing the amount of lubricant aerosol that contacts the membrane, while maintaining adequate airflow for venting.

In another aspect, the body may be formed from, or consist entirely of, the vent membrane or a laminate comprising the vent membrane. In this embodiment, the membrane of laminate may be formed by thermal or mechanical means to create a pouch for the sorbent. In this embodiment, the flange of the membrane is sealed to encapsulate the sorbent and provide a liquid tight seal.

Figure 2:
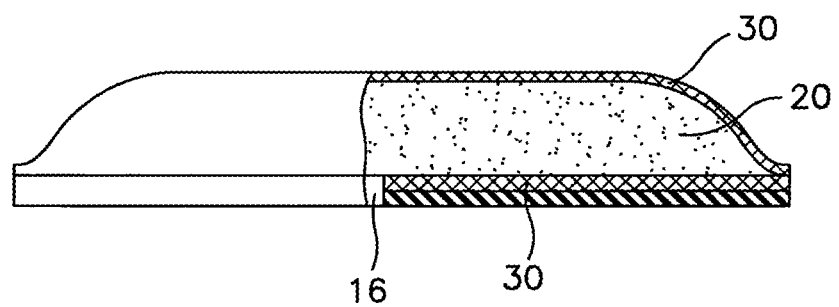
FIG. 2 depicts another embodiment of a vent according to the present invention.
Figure 3:
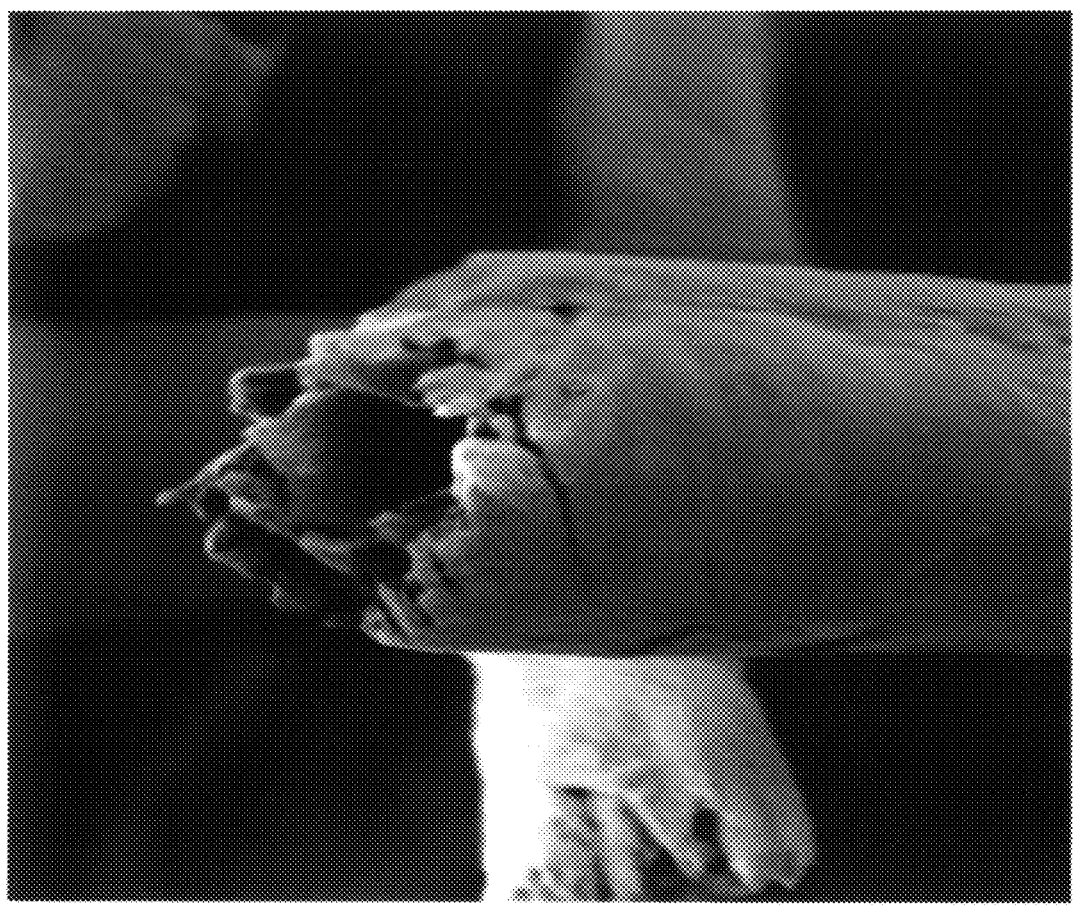
Figure 4:
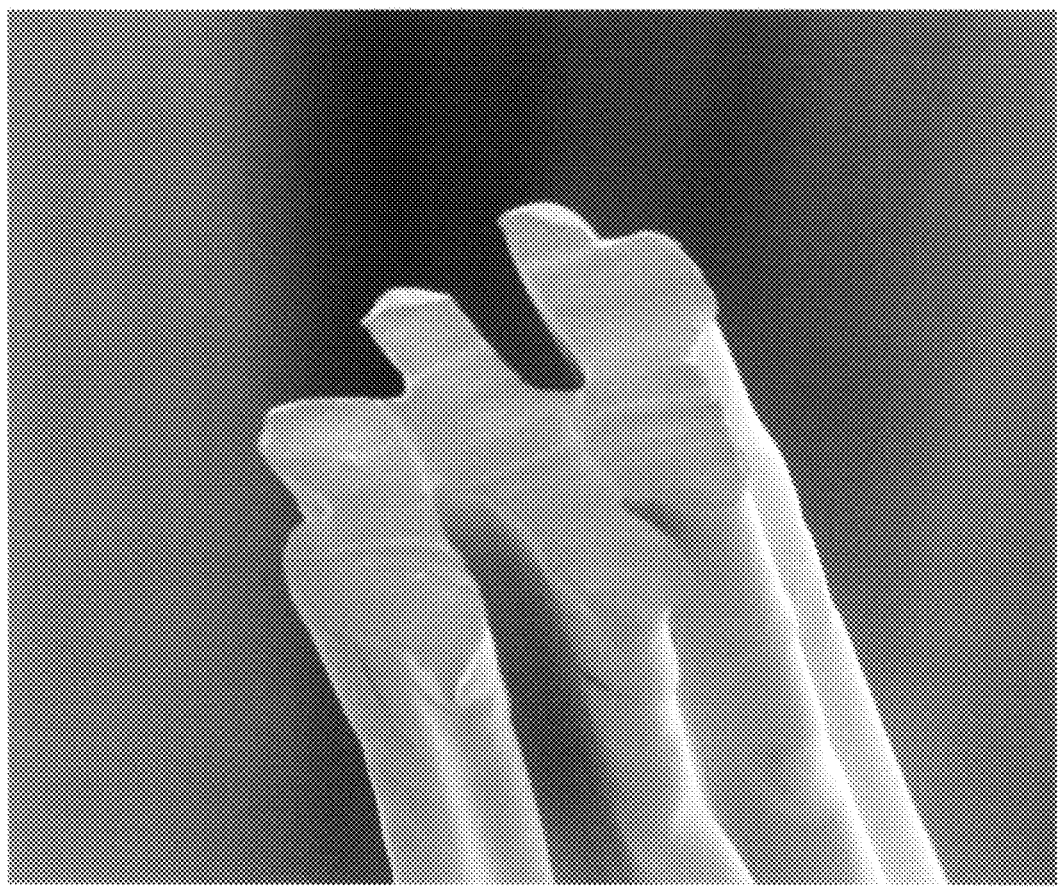
FIG. 4 is a photograph of a synthetic fiber with engineered surface features.

With reference to FIG. 2, fibrous sorbent (20) is disposed between two layers of membrane (30). The one membrane includes a hole, which provides a passageway (16). The vent may include adhesive media (31) to attach the vent to a machinery housing.

During venting, air passes through inter-fiber void spaces of the sorbent. Inter-fiber voids are necessary to maintain low pressure drop through the sorbent. In one aspect, the invention provides a venting system having a sorbent that maintains adequate inter-fiber void space. Sorption of oil helps to maintain inter-fiber void space in the sorbent.

In a preferred aspect, the fibrous sorbent is comprised of fibers having features which promote sorption of lubricant aerosols. Sorbent fibers may be adapted to promote adsorption, absorption, and, preferably both.

Thus, in one aspect, the fibers may be adsorbent. Adsorbent fibers may incorporate physical surface features such as twist, surface channels or pores. These surface features tend to promote migration of oil along the surface of the fiber. Distribution of oil droplets along the fibers helps to prevent formation of large droplets and maintain inter-fiber void space and may increase absorption rate.

In another aspect, the fibers may be absorbent. Absorbent fibers include internal physical or chemical structure that promotes migration of lubricant below the surface of the fiber, thereby preserving inter-fiber void space and maintaining pressure drop across the sorbent. Physical features promoting absorption include hollow lumen structures and chemical compositions that promote oil absorption. In preferred embodiment, the fibrous sorbent contains fibers that are hollow or contain significant void spaces.

Many natural fibers have desirable oil sorption properties due to a combination of effects. For example, cotton, kapok, milkweed, cellulose and other fibers contain axial void spaces due to the progressive cellular growth. Milkweed and kapok fibers have internal lumen structures in which up to 90% of the fiber diameter is lumen. Cotton fibers also contain significant void spaces that are distributed as concentric rings. Such rings are visible in FIG. 2. A single cotton fiber contains twenty to thirty concentric, hollow cellulose walls. Concentric rings and hollow structures promote wicking of oil into and throughout the fiber.

Kapok fibers also include axial hollow space in the interstices of cellular walls. The silky kapok fiber, or floss, is a tiny cellulose tube with air sealed inside. Kapok fibers have closed ends. Kapok fiber is considerably less dense than cotton fiber. Kapok is well known for stuffing life preservers and other water-safety equipment because of its excellent buoyancy. Kapok fiber is also lightweight, non-toxic, resistant to rot and odorless. Significantly, Kapok can absorb as much as 30 times its own weight in liquid oil.

In one embodiment, the sorbent fibers comprise wool. Wool fibers have an irregular, scaly surface, which may promote adsorption. The scaly structure provides large and accessible surface pores for oil deposits.

Moreover, wool contains high quantities of surface wax. Naturally occurring waxes may further contribute to oil sorption. Wax enhances the sorbent-oil interactions through hydrophobic interactions and improved oleophilic properties.

Moisture may interfere with the total sorption capacity of the sorbent. Accordingly, in one aspect, the fibers of the sorbent are hydrophobic.

The fibers of the sorbent may also include synthetic fibers. Synthetic fibers, such as polyester, polypropylene, nylon and acetate which have an engineered surface profile, are effective. Super adsorbent fibers with hydrophobic coatings may also have application as sorbents. Also, hollow synthetic fibers may be useful in certain applications. Where synthetic fibers are used, hydrophobic fibers are particularly preferred.

The fibers of the sorbent are most preferably oleophilic. Certain synthetic fibers are oleophilic because of their chemical structures. Oleophilicity enhances wicking, as well as surface transport of the oil along the fiber surface and between fibers.

The sorbent is contained within the vent and protected from the exterior environment by a membrane. The membrane may be of any material that provides air permeability and liquid impermeability. Exemplary membrane materials comprise polymers, for example polyethylene, polypropylene or fluoropolymers. Coming into consideration as fluoropolymers are tetrafluoroethylene/(perfluoroalkyl) vinyl ether copolymers (PFA), tetrafluoroethylene/hexafluoropropylene copolymers (FEP) and polytetrafluoroethylene (PTFE), with preference to be given to polytetrafluoroethylene, in particular expanded polytetrafluoroethylene (ePTFE). The membrane material is porous and, depending on the application area, may have pores of a size of from 0.01 to 20 µm. Such membranes are, by their nature, hydrophobic and are preferably rendered oleophobic. The membrane may be in the form of a laminate of membrane and support material.

The support materials may include non-woven, melt blown, or scrim polymeric materials. Preferably, these support materials have a substantially open structure.

The membrane is secured to the vent body by an air and water tight seal. In one aspect, the membrane includes a laminated layer of adhesive and is heat-sealed to the vent. In another embodiment, the membrane may be welded to the vent by ultrasonic welding.

Alternatively, the membrane is mechanically retained across the passageway with a sealing ring or like means. The method of attachment is not critical if an appropriately liquid proof and air tight seal is maintained across the passageway. Preferably, the membrane is heat sealed to the vent body.

EXAMPLES

Example 1 of a vent according to the present invention was constructed in the following manner: The vent body was machined from polyamide 6.6 in the general shape of a hollow threaded bolt. The body was formed with a hexagonal shaped head of a width accommodating an $11/16^{th}$ inch (approximately 1.75 cm) wrench. A $3/8^{th}$ inch (approximately 0.95 cm) NPT tapered pipe thread was machined into the vent body. A diameter hole drilled through the central axis of the vent body and head provided a passageway through the vent body. The passageway included a large counter bore through the head portion of the vent. The counter bore volume was approximately 0.75 ml and provided containment for the fibrous sorbent.

The fibrous sorbent comprised long natural Pima Cotton fibers. The fibers were obtained from South Eastern Arizona Cotton Cooperatives, 250 mg of cotton is hand pressed into the counter bore cavity in the vent body. A membrane covered the cotton sorbent.

The membrane was an approximately 8 (±1) mil thick oleophobic ePTFE membrane. The membrane had an air permeability of 8 Gurley, a water entry pressure (WEP) of at least 3 psi. These membranes, as well as other membranes useful in the present application are obtainable from W. L. Gore and Associates, Inc., Elkton, Md. The membrane contains the cotton fibers within the vent cavity. The membrane disk is heat sealed to the vent body material using a copper sealing tool. The sealing was performed by applying a force of 660 Newtons at 250° C. for 1.0 second. Polyamides such as the material used for the vent body contain significant moisture. Therefore, the body was dried in an oven for approximately 12 hours at 125° C. prior to welding.

Further examples were prepared using other sorbent media and different sorbent media packing density. Example 2 was prepared according to the description of Example 1; however, 0.2587 g natural cotton adsorbent was disposed within the vent passageway. Example 3 was prepared according to the description of Example 1; however, 0.2108 g of FIT 4DG polyester fiber adsorbent was disposed within the vent passageway. Comparative Example 4 was assembled without adsorbent media.

Vent Longevity Testing:

Performance of the inventive vents was demonstrated using the apparatus depicted schematically in FIG. 6 and according to the following experimental procedure:

An aerosol generator (40) (Nucon) was filled with a sufficient volume of gear oil (42) (Lubrizol polyalphaolefin). Inlet pressure was established at 25 psi (approximately 0.17 MPa) by supplying air at inlet (44) to generate an aerosol (46) challenge rate of approximately 0.2 g/min with 99% of particles being less than 2 microns.

The vents to be tested were connected to the aerosol generator by a 0.25 inch diameter (approximately 0.64 cm) polypropylene airline (48). The airline and vent were oriented vertically. The outlet of the vent was connected to an airflow meter (50) by a 0.375 inch diameter (approximately 0.95 cm) polypropylene airline (49).

Figure 5:
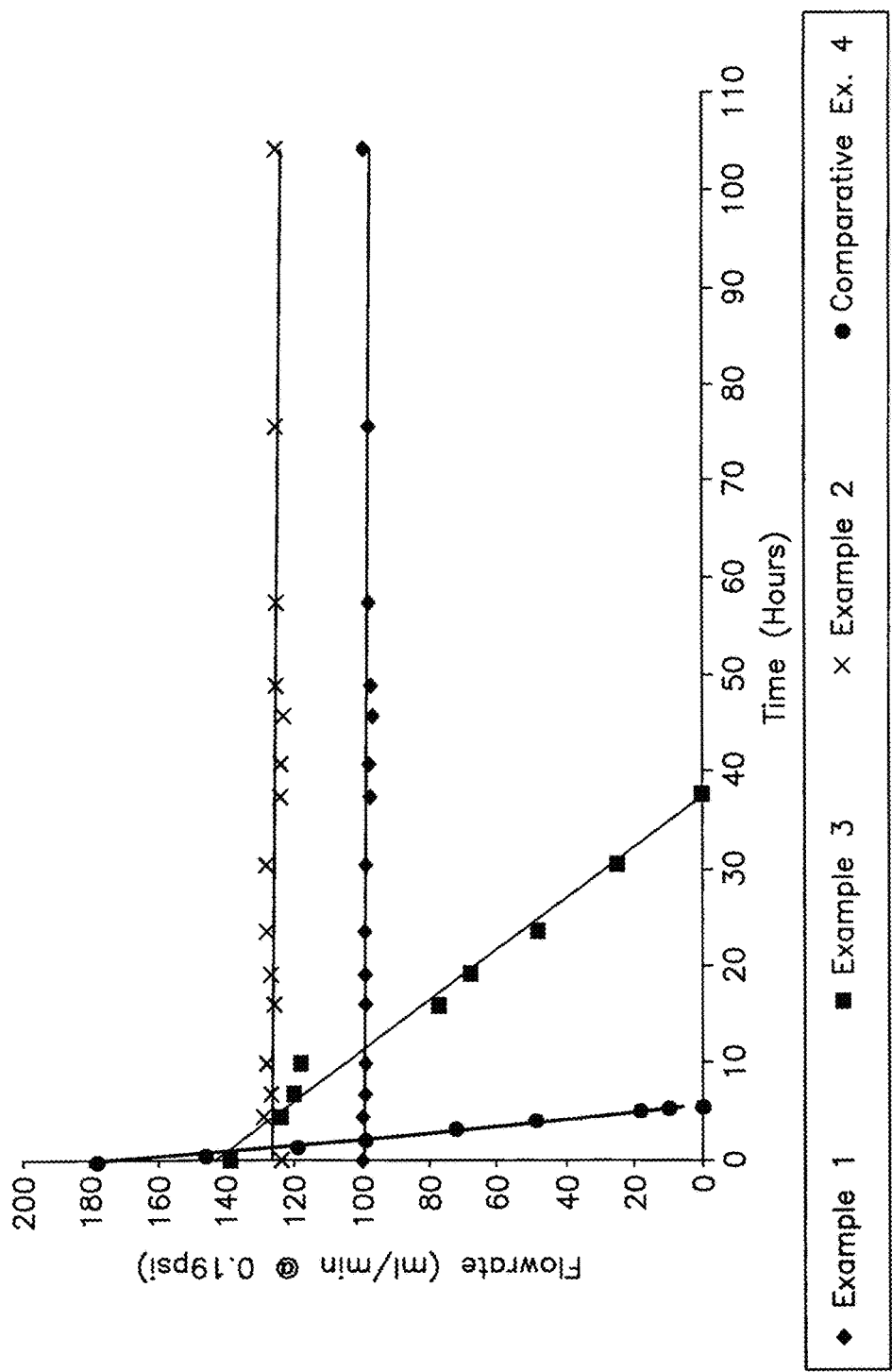
FIG. 5 is a chart depicting the airflow for various sorbent media.

The 0.25 inch diameter (approximately 0.64 cm) polypropylene airline was first connected to a clean air supply and the air flow was adjusted to generate a 0.19 psi (approximately 1310 Pa) differential pressure across the test sample. The volumetric flow at 0.19 psi (approximately 0.1310 Pa) back pressure was recorded through the sample. The vent was then connected to the aerosol generator, which was adjusted to provide the same volumetric flow as the clean air source. Airflow was monitored with a flowmeter (50) to determine the time at which airflow begins to degenerate due to aerosol blinding of the ePTFE membrane. The time verses airflow is reported in FIG. 5.

Water Entry Pressure (WEP)

Water entry pressure provides a test method for water intrusion through membranes. A test sample is clamped between a pair of testing plates. The lower plate has the ability to pressurize a section of the sample with water. A piece of pH paper is placed on top of the sample between the plate on the nonpressurized side as an indicator of evidence for water entry. The sample is then pressurized in small increments, waiting 10 seconds after each pressure change until a color change in the pH paper indicates the first sign of water entry. The water pressure at breakthrough or entry is recorded as the Water Entry Pressure. The test results are taken from the center of test sample to avoid erroneous results that may occur from damaged edges.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. An improved vent for a machinery enclosure of the type containing a passageway for the passage of a gas between an interior of the enclosure and an ambient air and a porous, gas permeable membrane covering the passageway, the improvement comprising fibrous sorbent comprising natural fibers disposed within the passageway between the membrane and the interior of the enclosure for at least sorption by absorption of lubricant aerosols into the natural fibers of the fibrous sorbent and gas passage therebetween.

2. A vent for a machinery enclosure, the machinery enclosure having an interior containing a lubricant and machinery which applies a shearing force to said lubricant to generate lubricant aerosol, the vent comprising:
   a. a body having a passageway there through,
   b. gas permeable, water impermeable, oleophobic membrane covering the passageway, and
   c. fibrous sorbent comprising natural fibers disposed within the passageway between the machinery enclosure interior and the membrane at least for sorption by absorption of the lubricant aerosols into the natural fibers of the fibrous sorbent and gas passage therebetween.

3. The vent of claim 2 in which the membrane comprises ePTFE.

4. The vent of claim 2 in which the membrane is less than 6 inches (15.24 cm) from the interior of the enclosure.

5. The vent of claim 2 in which the natural fibers comprise cotton.

6. The vent of claim 2 in which the natural fibers comprise kapok.

7. The vent of claim 2 in which the natural fibers comprise milkweed.

8. The vent of claim 2 in which the fibrous sorbent comprises wool.

9. The vent of claim 2 in which the fibrous sorbent further comprises synthetic fibers.

10. The vent of claim 9 in which the synthetic fibers are selected from the group comprising polypropylene, polyethylene, rayon, nylon 6 and nylon 6,6.

11. The vent of claim 9 in which the synthetic fibers comprise polyethylene.

12. The vent of claim 2 in which the fibrous sorbent comprises fibers having internal void space for said absorption of the lubricant aerosols into the internal void space of the fibers.

13. The vent of claim 2 in which the fibrous sorbent comprises hollow fibers for said absorption of the lubricant aerosols into the hollow fibers.

14. The vent of claim 2 in which the fibrous sorbent comprises fibers having surface features.

15. The vent of claim 2 in which the fibrous sorbent is hydrophobic.

16. The vent of claim 2 in which the fibrous sorbent is oleophilic.

17. The vent of claim 2 further comprising a support material laminated to the membrane.

18. A vented machinery enclosure, comprising:
   a. a fluid tight housing defining an interior space and an exterior space, the interior space containing lubricant, said lubricant subject to shearing force to generate lubricant aerosols,
   b. a vent comprising a body having a passageway therethrough,
   c. gas permeable, water impermeable, oleophobic membrane covering the passageway, and
   d. fibrous sorbent comprising natural fibers disposed within the passageway, adjacent to a first side of said membrane between the membrane and the interior space at least for sorption by absorption of the lubricant aerosols and gas passage therebetween, the natural fibers of said fibrous sorbent having voids for said absorption of the lubricant aerosols into the voids of the natural fibers.

19. The vented machinery enclosure of claim 18 in which the membrane comprises ePTFE.

20. The vented machinery enclosure of claim 18 in which the membrane is less than 6 inches (15.24 cm) from the interior space of the enclosure.

21. The vented machinery enclosure of claim 18 in which the natural fibers comprise cotton.

22. The vented machinery enclosure of claim 18 in which the natural fibers comprise kapok.

23. The vented machinery enclosure of claim 18 in which the natural fibers comprise milkweed.

24. The vented machinery enclosure of claim 18 in which the fibrous sorbent comprises wool.

25. The vented machinery enclosure of claim 18 in which the fibrous sorbent further comprises synthetic fibers.

26. The vented machinery enclosure of claim 25 in which the synthetic fibers are selected from the group comprising polypropylene, polyethylene, rayon, nylon 6 and nylon 6,6.

27. The vented machinery enclosure of claim 25 in which the synthetic fibers comprise polyethylene.

28. The vented machinery enclosure of claim 18 in which the fibrous sorbent comprises fibers having internal void space for said absorption of the lubricant aerosols into the internal void space of the fibers.

29. The vented machinery enclosure of claim 18 in which the fibrous sorbent comprises hollow fibers for said absorption of the lubricant aerosols into the hollow fibers.

30. The vented machinery enclosure of claim 18 in which the fibrous sorbent comprises fibers having surface features.

31. The vented machinery enclosure of claim 18 in which the fibrous sorbent is hydrophobic.

32. The vented machinery enclosure of claim 18 in which the fibrous sorbent is oleophilic.

33. The vented machinery of claim 18 further comprising a support material laminated to the membrane.

34. A vented machinery enclosure comprising:
   a. gear assembly disposed within an interior of the enclosure,
   b. lubricant disposed within the interior of the enclosure, said lubricant subject to shearing by said gear assembly to generate lubricant aerosols,
   c. passageway providing fluid communication between the interior of the enclosure and an exterior,
   d. gas permeable, water impermeable, oleophobic membrane covering the passageway, and
   e. fibrous sorbent comprising natural fibers disposed within the passageway between said interior and said membrane at least for sorption by absorption of the lubricant aerosols into the natural fibers of the fibrous sorbent and gas passage therebetween.

35. The vented machinery enclosure of claim 34 in which the membrane comprises ePTFE.

36. The vented machinery enclosure of claim 34 in which the membrane is less than 6 inches (15.24 cm) from the interior of the enclosure.

37. The vented machinery enclosure of claim 34 in which the natural fibers comprise cotton.

38. The vented machinery enclosure of claim 34 in which the natural fibers comprise kapok.

39. The vented machinery enclosure of claim 34 in which the natural fibers comprise milkweed.

40. The vented machine enclosure of claim 34 in which the fibrous sorbent comprises wool.

41. The vented machinery enclosure of claim 34 in which the fibrous sorbent further comprises synthetic fibers.

42. The vented machinery enclosure of claim 41 in which the synthetic fibers are selected from the group comprising polypropylene, polyethylene, rayon, nylon 6, nylon 6,6.

43. The vented machinery enclosure of claim 41 in which the synthetic fibers comprise polyethylene.

44. The vented machinery enclosure of claim 34 in which the fibrous sorbent comprises fibers having internal void space for said absorption of the lubricant aerosols into the internal void space of the fibers.

45. The vented machinery enclosure of claim 34 in which the fibrous sorbent comprises hollow fibers for said absorption of the lubricant aerosols into the hollow fibers.

46. The vented machinery enclosure of claim 34 in which the fibrous sorbent comprises fibers having surface features.

47. The vented machinery enclosure of claim 34 in which the fibrous sorbent is hydrophobic.

48. The vented machinery enclosure of claim 34 in which the fibrous sorbent is oleophilic.

49. The vented machinery enclosure of claim 34 further comprising a support material laminated to the membrane.

50. In an improved method of venting a machinery space containing a lubricant that is subject to a shearing force of machinery within the machinery space to generate lubricant aerosols, said method comprising:
   a. providing a passageway for venting a gas from an interior of the machinery space and
   b. providing a porous, gas permeable membrane covering the passageway, the improvement comprising providing a fibrous sorbent comprising natural fibers in the passageway between the membrane and the interior of the machinery space for at least sorption by absorption of the lubricant aerosols into the natural fibers of the fibrous sorbent and gas passage therebetween.

\* \* \* \* \*